May 5, 1931.  A. E. PAYSON ET AL  1,803,639

REFRIGERATING APPARATUS

Filed Sept. 21, 1928

Inventors:
AURIN E. PAYSON
MINER P. WETMORE
BY
Adolph A. Thomas
ATTORNEY

Patented May 5, 1931

1,803,639

UNITED STATES PATENT OFFICE

AURIN E. PAYSON AND MINER P. WETMORE, OF NORWICH, CONNECTICUT

REFRIGERATING APPARATUS

Application filed September 21, 1928. Serial No. 307,348.

Our invention relates to refrigerating apparatus, and its object is to provide a cabinet particularly adapted to keep ice cream and other confections at the required low temperature by means of solidified carbon dioxide gas or like refrigerant. For this purpose we employ a heat-insulated receptacle properly mounted in a suitable casing. This receptacle, which is preferably a jar of the double-walled vacuum type, has a bottom chamber for containing a supply of dry ice or other refrigerating agent. The top of the cooling chamber is closed by a disk or plug on which rests a metal plate connected with the cooling chamber by heat-conducting members of metal, such as chains or rods of copper or brass, and the like. The confection to be frozen is contained in a metal can placed on the metal plate, so that a continuous metallic connection is established between the refrigerant at the bottom of the jar and the material in the can. This is important, as otherwise the carbon dioxide gas, which is heavier than air and tends to settle at the bottom of the jar, will not refrigerate the upper space around the can low enough to keep ice cream in frozen condition. We found this out by repeated experiments and have successfully removed the difficulty by providing the heat-conducting metal connection referred to. We may also provide a metal shell inside the jar to facilitate the conduction of heat (i. e. low temperature) from the freezing chamber to the space around the metal container. By mounting all parts of the refrigerating mechanism inside the jar, the top of the enclosing cabinet is left flat to serve as a table for trays, cups and glasses. This feature is of real practical value in stores where our new refrigerating cabinet is used to dispense ice cream.

The foregoing and other practical advantages of our invention will be fully understood from a detailed description of the embodiment illustrated in the accompanying drawings in which—

Figure 1:
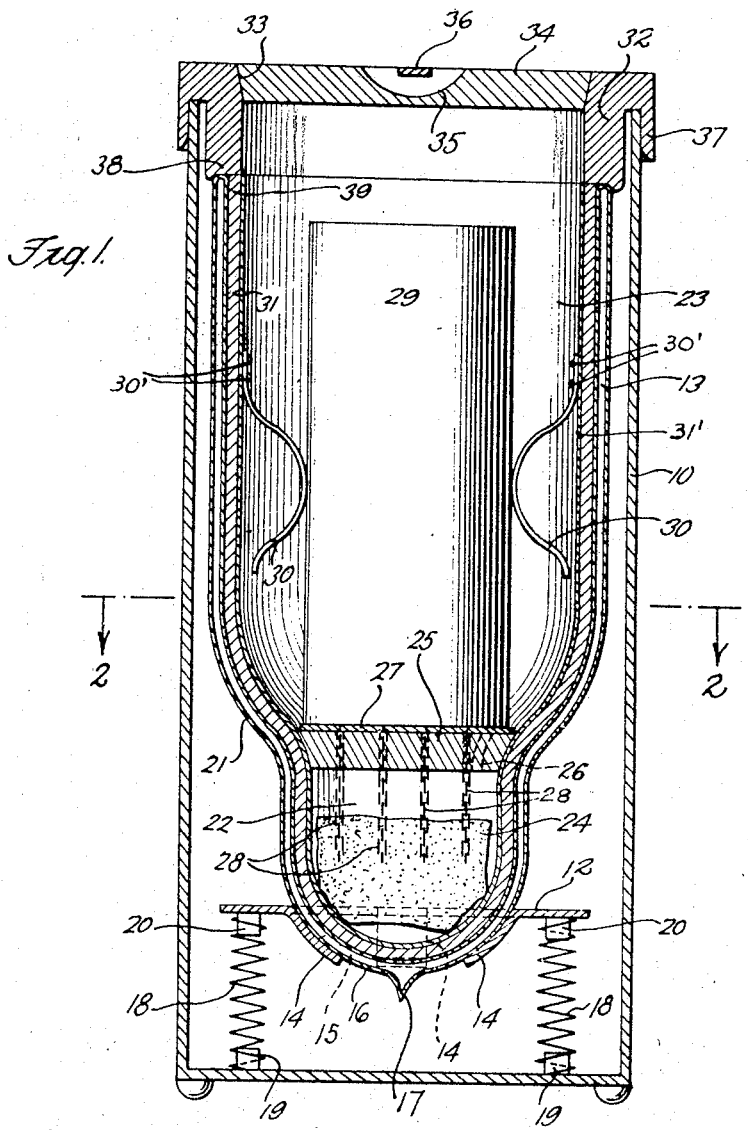
Figure 2:
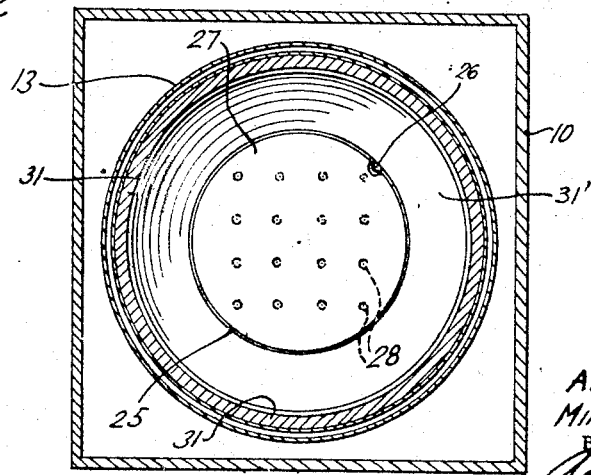

Fig. 1 is a vertical section through an ice cream cabinet constructed in accordance with our invention; and Fig. 2 is a horizontal cross-section on line 2—2 of Fig. 1.

An outer casing 10 is provided at the bottom with a spring support 12 adapted to receive a heat-insulated receptacle 13. If the casing 10 is of wood, it is cheapest to construct it as a rectangular box; but if it is of sheet metal, the best way is to make it in cylindrical shape. The particular construction of the outer casing is immaterial, provided it is practical to use. The spring support 12 may comprise a sheet metal plate provided with radial arms or extensions 14, which are so shaped as to form a spherical recess 15 adapted to receive the rounded bottom 16 of receptacle 13. In the broader aspect of our invention, the receptacle or container 13 may be of any practical construction and design, but at this time we prefer a double-walled vacuum jar of strong glass, such as Pyrex glass, which is capable of withstanding mechanical shocks and changes of temperature. For brevity and convenience we shall refer to the receptacle 13 as a jar, without thereby intending any structural limitation here and in the claims. The annular vacuum space between the inner and outer walls of jar 13 is evacuated through a tip 17, which is accommodated in the central space between the extensions 14 of plate 12. Strong compression coil springs 18 act as a resilient mounting for the jar-supporting plate 12. The lower ends of springs 18 are attached to lugs 19 on the bottom of casing 10, and the other ends of the springs are connected to lugs 20 projecting from the bottom of support 12. Any other practical form of resilient mounting for the jar 13 may be employed.

The heat-insulated jar 13 is provided with an annular shoulder or breast portion 21, which divides the jar into a small lower chamber 22 and a large upper chamber 23 of greater diameter than the lower chamber, which is adapted to contain a suitable refrigerant 24. At the present time we prefer to use dry ice, as solidified carbon dioxide is commercially known, because it is easily available and performs its intended function with satisfactory results. The cooling chamber 22 is closed by a disk or plug 25, preferably of non-conducting material, such as bakelite, hard rubber, cork and the like. The plug 25 has one or more vents 26 to permit the escape of carbon dioxide gas from chamber 22 into the upper chamber 23. On top of the insulated plug 25 rests a metal plate or disk 27 to which metallic heat-conductors 28 are attached. The conductors 28 are shown as chains, but they may be rods, coils, or other practical forms of metallic heat-conductors for establishing a good thermal connection between the cooling chamber 22 and the metal plate 27. Chains of copper have been found to give satisfactory results. The plug 25 is provided with holes through which the metal conductors 28 extend into the cooling chamber.

A metal can 29 containing a suitable confection is placed on the metal plate 27, so that a direct metallic heat-conducting connection is established between the refrigerant in chamber 22 and the confection in can 29. In this way, the cooling action of the refrigerant is effectively communicated to the contents of container 29. Springs 30 hold the container 29 in firm position on the metallic supporting plate 27, and at the same time they act as shock absorbers in a lateral or radial direction. The inside of glass jar 13 is preferably provided with a lining 31 molded of bakelite, asphaltum, hard rubber, or the like, to conform to the shape of the jar, and over the lining 31 fits a sheet metal shell 31' of good heat-conducting properties. This shell may be spun of aluminum, brass, copper, iron and so on. The lining 31 constitutes a heat-insulating backing for the conducting shell 31', which forms a metal connection of large surface area between the freezing chamber 22 and the upper chamber 23 where the confection is located. The parts 31 and 31' not only improve the heat-insulating properties of the jar, but also protect the jar against breakage. The plug 25 rests on the metal shell 31', which is preferably in direct contact with the periphery of metal plate 27. It is convenient to attach the centering springs 30 to the metal shell 31', as shown at 30'. If asphaltum is used for the lining 31, it may be poured in a liquid state into the space between the jar and the metal shell 31'. This allows the liquid asphaltum to take up any irregularities or unevenness in the adjacent glass and metal surfaces.

The top of the outer cabinet 10 is closed by a cover 32 which is preferably of heat-insulating material like bakelite, hard rubber or other molded composition. The cover 32 has a circular opening 33 adapted to be closed by a stopper 34, which may be of the same material as the cover. To leave the top of stopper 34 flat, it may be provided at the center with a recess 35 bridged by a finger piece 36, which may be molded integral with the stopper or a separate metal strip imbedded at its ends in the molded material of the stopper. The cover 32 has an outer flange 37 adapted to fit over the upper rim of cabinet 10, and the inner wall of the cover is formed with an annular shoulder 38 and an annular extension 39. The shoulder 38 engages the top of jar 13, and the extension 39 engages the top of the shell 31, whereby the jar and its shell are firmly held in upright position by the cover 32. The opening 33 is wide enough to permit the easy insertion and removal of the container 29. The stopper 34 may have one or more vents to permit the escape of carbon dioxide gas when the pressure in chamber 23 becomes too great. In the ordinary use of the ice cream cabinet, the frequent removal of the stopper allows the escape of accumulated gas from the cabinet.

It will be seen from the preceding description that we have provided a simple, compact and efficient refrigerating device for keeping confections at the required freezing temperature. The parts are easy to assemble and easy to separate, so that the replenishing of the refrigerant is a simple matter. The use of dry ice not only gives better refrigeration than ordinary water ice, but it permits the cabinet to be always dry and easily kept clean. In the old form of ice cream cabinets, the ice cream cans are placed in a mass of packed ice, which on melting is liable to produce an unsightly condition behind the counter where the ice cream is dispensed. This cannot happen in the use of our new refrigerating cabinet. Furthermore, ice cream cabinets containing water ice are rather bulky affairs, since the ice chamber must be comparatively large. The cabinet of our invention can be made very compact and need not be much larger than the jar that contains the ice cream can. This compactness of structure is of practical importance, since the space behind counters in many of the stores is limited, and a saving of space is always a factor of economy in stores where high rents prevail.

Although we have shown and described a specific construction, we want it understood that our invention is not limited to the details set forth. Changes and modifications may be adopted without departing from the scope of the invention as defined in the following claims.

We claim as our invention:

1. In refrigerating apparatus, a heat-insulated jar having an inner transverse partition removably supported by the side walls of the jar below the top and above the bottom thereof, so that the space below said partition constitutes a chamber for holding a refrigerant, the space above said partition constituting a freezing chamber larger than said lower chamber, said partition also serving as a support for a container in said freezing chamber.

2. In refrigerating apparatus, a heat-insulated jar having a removable transverse partition supported by the inner side wall of said jar and adapted to divide the same into a lower chamber and an upper chamber, said lower chamber being adapted to contain dry ice and said upper chamber being adapted to contain material to be refrigerated, and metallic means for establishing a heat-conducting connection between said chambers.

3. In refrigerating apparatus, a jar having a bottom chamber to hold a gaseous refrigerant, means to support a metal container inside the jar above the refrigerating chamber, and metallic heat-conductors extending from said chamber to the metal container on said supporting means.

4. In refrigerating apparatus, a double-walled vacuum jar of glass having a bottom chamber to hold a refrigerating agent, a shell mounted inside the jar to form a lining therefor, and means mounted in said shell to support a container within the jar above said refrigerating chamber.

5. In refrigerating apparatus, a heat-insulated jar supported in upright position, a non-metallic transverse disk supported in said jar by the cylindrical wall thereof to divide the jar into a lower chamber and an upper chamber, the lower chamber being adapted to receive a refrigerating agent and the upper chamber being adapted to receive a metal container, and means for establishing a metallic heat-conducting connection between the refrigerating chamber and the metal container in the upper chamber.

6. Refrigerating apparatus comprising a heat-insulated jar having a closed bottom, a member mounted in said jar and supported by the side wall thereof to divide the jar into a small lower chamber and a large upper chamber, said lower chamber being adapted to receive a gaseous refrigerant, a metal container in said upper chamber removably supported by said member which has an opening to permit the escape of refrigerating gas into the upper chamber, and means for establishing a metallic connection between the refrigerating chamber and said container.

7. In refrigerating apparatus, a heat-insulated jar having a closed bottom, a metal plate supported in said jar and dividing the same into a lower chamber and an upper chamber, said lower chamber being adapted to receive a gaseous refrigerant, and metallic members extending from said plate into the refrigerating chamber, said metal plate being adapted to support a metal container holding the material to be kept cold.

8. Refrigerating apparatus comprising a heat-insulated jar having a closed bottom, a non-metallic partition mounted in said jar to divide the same into a lower chamber and an upper chamber, said lower chamber being adapted to receive a gaseous refrigerant, a metal plate on said partition, metallic members connected to said plate and extending through said partition into the refrigerating chamber, and a metal container supported on said metal plate.

9. In refrigerating apparatus, a heat-insulated jar supported in upright position and divided into a lower chamber and an upper chamber, the lower chamber being adapted to receive a refrigerating agent and the upper chamber being adapted to receive a metal container, and means for establishing a metal heat-conducting connection between the refrigerating chamber and the metallic container in the upper chamber, said means including chains of good heat-conducting metal hanging into the refrigerating chamber.

10. In refrigerating apparatus, a double-walled vacuum jar of glass having an integral annular shoulder below its top rim for dividing the jar into a lower chamber and an upper chamber of larger diameter than the lower chamber, said lower chamber being adapted to receive a refrigerant and said upper chamber being adapted to receive articles to be refrigerated.

11. In refrigerating apparatus, the combination of a double-walled vacuum jar of glass having an integral annular shoulder below its top rim for dividing the jar into a lower chamber and an upper chamber of larger diameter than the lower chamber said lower chamber being adapted to receive a refrigerant and said upper chamber being adapted to receive articles to be refrigerated, and a protective shell fitting in said jar and resting on said shoulder.

12. Refrigerating apparatus comprising a double-walled vacuum jar of glass having a closed bottom and an annular shoulder which divides the jar into a lower chamber and an upper chamber, said lower chamber being of smaller diameter than said upper chamber and adapted to contain a refrigerant, and a container removably supported in said upper chamber in thermal relation to the refrigerating chamber.

13. Refrigerating apparatus comprising a heat-insulated jar having a closed bottom and formed with an annular shoulder above said bottom, a member supported by said shoulder and dividing the jar into a lower chamber and an upper chamber of greater diameter than said lower chamber, the latter being adapted to receive a refrigerating agent, a metal container supported on said member, and means for establishing a metallic connection between the refrigerating chamber and said container.

14. In refrigerating apparatus, a double-walled vacuum jar of glass supported in upright position and having an integral annular shoulder above the closed bottom, said shoulder dividing the jar into a small lower chamber and a larger upper chamber, the lower chamber being adapted to receive a refrigerating agent, means supported by said shoulder for holding a metal container in the upper chamber, and metallic means for conducting the cold from the refrigerating chamber to said container.

15. In refrigerating apparatus, a heat-insulated jar having a closed bottom and formed with an annular shoulder above said bottom, a metal plate supported by said shoulder and dividing the jar into a lower chamber and an upper chamber of greater diameter than said lower chamber, the latter being adapted to receive a refrigerating agent, and metallic members extending from said plate into the refrigerating chamber, said metal plate being adapted to support a metal container holding the material to be kept cold.

16. In refrigerating apparatus, a heat-insulated glass jar having a small lower chamber and a large upper chamber, said lower chamber being adapted to contain dry ice and said upper chamber being adapted to contain material to be refrigerated, and a separate metal shell inside the glass jar extending from the upper chamber to the lower chamber, said shell being shaped substantially like the inner wall of said jar to constitute a metallic lining therefor.

17. Refrigerating apparatus comprising an outer casing or cabinet, a resilient support at the bottom of said casing, a heat-insulated jar having a closed bottom engaging said support, the lower portion of said jar forming a chamber for receiving a refrigerant, means for supporting a container in said jar above the refrigerating chamber, a removable top-piece on said casing, said top-piece having means to engage the upper edge of said jar and thereby hold the same against lateral displacement, and a removable stopper carried by said top-piece.

18. Refrigerating apparatus comprising an outer casing or cabinet, a resilient support at the bottom of said casing, said support having a spherical recess, a double-walled vacuum jar of glass having a closed rounded bottom fitting in said recess, said jar being provided with an integral annular shoulder which divides the jar into a small lower chamber and a larger upper chamber, the lower chamber being adapted to receive a refrigerating agent, a separate protective shell mounted inside the jar and supported by said shoulder, means carried by said shell for supporting a container in the jar above the refrigerating chamber, a removable top-piece on said casing, said top-piece having means to engage the upper edges of said jar and shell, and a removable stopper carried by said top-piece.

AURIN E. PAYSON.
MINER P. WETMORE.